(12) United States Patent
Sakamaki

(10) Patent No.: US 9,395,783 B2
(45) Date of Patent: *Jul. 19, 2016

(54) MOBILE TERMINAL AND DISPLAY PANEL DRIVER

(71) Applicant: Synaptics Display Devices GK, Tokyo (JP)

(72) Inventor: Goro Sakamaki, Tokyo (JP)

(73) Assignee: SYNAPTICS DISPLAY DEVICES GK, Tokyo (JP)

( * ) Notice: Subject to any disclaimer, the term of this patent is extended or adjusted under 35 U.S.C. 154(b) by 176 days.

This patent is subject to a terminal disclaimer.

(21) Appl. No.: 14/229,627

(22) Filed: Mar. 28, 2014

(65) Prior Publication Data

US 2014/0298065 A1    Oct. 2, 2014

(30) Foreign Application Priority Data

Apr. 1, 2013    (JP) ................................. 2013-076278

(51) Int. Cl.
| | | |
|---|---|---|
| *G06F 1/30* | (2006.01) | |
| *G06F 1/16* | (2006.01) | |
| *G09G 5/00* | (2006.01) | |

(52) U.S. Cl.
CPC ................ *G06F 1/30* (2013.01); *G06F 1/1626* (2013.01); *G09G 5/00* (2013.01)

(58) Field of Classification Search
CPC ....... G06F 1/30; G06F 1/1626; G06F 1/3262; G09G 5/00

See application file for complete search history.

(56) References Cited

U.S. PATENT DOCUMENTS

| | | | | |
|---|---|---|---|---|
| 7,505,035 | B2* | 3/2009 | Nitawaki ................ | G09G 3/36 345/211 |
| 9,111,500 | B2* | 8/2015 | Al-Dahle ............. | G09G 3/3648 |
| 2008/0165099 | A1* | 7/2008 | Cho ..................... | G09G 3/3406 345/87 |
| 2008/0165109 | A1* | 7/2008 | Joo ....................... | G09G 3/3677 345/98 |
| 2009/0058787 | A1* | 3/2009 | Weng ................... | G09G 3/3677 345/98 |
| 2011/0012888 | A1* | 1/2011 | Ko ........................ | G09G 3/3648 345/212 |
| 2011/0181573 | A1* | 7/2011 | Lee ....................... | G09G 3/3611 345/211 |

* cited by examiner

*Primary Examiner* — Fahmida Rahman

(74) *Attorney, Agent, or Firm* — McGinn IP Law Group PLLC

(57) ABSTRACT

A display device includes a boosting power supply circuit, a logic circuit and a charge transport path. The boosting power supply circuit generates a boosted power supply voltage by boosting an analog power supply voltage. The logic circuit is responsive to a decrease in a voltage level on at least one of power supply lines to which analog and logic power supply voltages are supplied for controlling a source line drive circuitry and a gate line drive circuitry to discharge charges accumulated in the display panel. The charge transport path is configured to transport charges from a power supply line on which the boosted power supply voltage is generated to a power supply line which supplies an internal logic power supply voltage to the logic circuit in response to the decrease in the voltage level on the at least one of the first and second power supply lines.

7 Claims, 14 Drawing Sheets

MOBILE TERMINAL AND DISPLAY PANEL DRIVER

CROSS REFERENCE

This application claims priority of Japanese Patent Application No. Japanese Patent Application No. 2013-076278, filed on Apr. 1, 2014, the disclosure which is incorporated herein by reference.

TECHNICAL FIELD

The present invention relates to a mobile terminal and a display panel driver, more particularly, relates to optimization of the operation of a display panel driver when a power supply from an electric power storage device (for example, a battery) is stopped.

BACKGROUND ART

Mobile terminals, such as cellular phones, smart phones and tablet terminals, typically include a battery or a similar electric power storage device, and respective devices installed in the mobile terminals operate on electric power received from the electric power storage device.

One issue to be addressed in the design of a mobile terminal is that the electric power supply from the electric power storage device may be suddenly stopped. The most typical example in which the electric power supply from the electric power storage device is suddenly stopped is the case when the electric power storage device is removed from the mobile terminal by a user. Many mobile terminals are designed such that the battery is replaceable by the user and, in such a design, the user may remove the battery from the mobile terminal. Even in the case when the mobile terminal is designed so that the battery cannot be easily removed by the user, the battery may be removed in the product inspection by an inspector.

When the power supply from the electric power storage device is suddenly stopped, the system becomes unable to continue the operation and an abnormal shutdown occurs. It is desired that a mobile terminal is designed so that, even when a sudden break of the electric power supply from the electric power storage device causes an abnormal shutdown, the abnormal shutdown does not cause a malfunction.

In general, a mobile terminal includes a panel display device such as a liquid crystal display device and it would be therefore desirable that a panel display device does not suffer from a malfunction even when an abnormal shutdown occurs. Under such a background, the inventor has studied suppression of malfunctions of a panel display device when an abnormal shutdown occurs.

One malfunction studied by the inventor is occurrence of an abnormal display on the panel display device. When an abnormal shutdown occurs due to a stop of the electric power supply from the electric power storage device, the operation of the system is stopped in a situation in which charges remain in the display panel of the panel display device and this may result in that an abnormal display appears on the display panel. In general, when the system is normally shut down, the operation of the system is stopped after the charges remaining in the display panel are discharged and the abnormal display on the display panel is thereby avoided. When an abnormal shutdown occurs due to a stop of the power supply from the electric power storage device, however, it is difficult to avoid the abnormal display onto the display panel by carrying out the same operation as the case when the system is normally shut down.

From such a background, it is desirable if a technique is provided which suppresses occurrence of an abnormal display on a display device in the case when an abnormal shutdown occurs due to a stop of the electric power supply.

SUMMARY OF THE INVENTION

Therefore, an objective of the present invention is to provide a technique which suppresses occurrence of an abnormal display on a display device in the case when an abnormal shutdown occurs due to a stop of the electric power supply.

The person skilled in the art would understand other objectives and technical advantages of the present invention on the basis of the following disclosure.

In an aspect of the present invention, a mobile terminal includes: a display panel which includes source lines and gate lines; an electric power storage device; a power supply circuitry which generates an analog power supply voltage and a first logic power supply voltage from electric power received from the electric power storage device and supplies the analog power supply voltage to a first power line and the first logic power supply voltage to a second power supply line; a boosting power supply circuit configured to receive the analog power supply voltage from the first power line, to generate a boosted power supply voltage by boosting the received analog power supply voltage and to supply the boosted power supply voltage to a third power line; a gate line drive circuitry which receives the boosted power supply voltage from the third power line to drive the gate lines; a source line drive circuitry which drives the source lines; a first regulator configured to generate a second logic power supply voltage by stepping down the first logic power supply voltage and to supply the second logic power supply voltage to a fourth power line; a logic circuit configured to receive the second logic power supply voltage from the fourth power supply line and to control the gate line drive circuitry and the source line drive circuitry; and a charge transport path. The logic circuit is responsive to a decrease in a voltage level on at least one of the first and second power supply lines for controlling the source line drive circuitry and the gate line drive circuitry to discharge charges accumulated in the display panel. The charge transport path is configured to transport charges from the third power supply line to the fourth power supply line in response to the decrease in the voltage level on the at least one of the first and second power supply lines.

In another aspect of the present invention, a display panel driver is provided which drives a display panel including source lines and gate lines. The display panel driver includes: a first power line receiving an analog power supply voltage; a second power line receiving a first logic power supply voltage; a boosting power supply circuit configured to receive the analog power supply voltage from the first power line, to generate a boosted power supply voltage by boosting the received analog power supply voltage and to supply the boosted power supply voltage to a third power line; a gate control and drive circuit which receives the boosted power supply voltage from the third power line and generates a gate control signal which controls a gate driver or gate drive signals which drive the gate lines; a source drive circuit which drives the source lines; a first regulator configured to generate a second logic power supply voltage by stepping down the first logic power supply voltage and to supply the second logic power supply voltage to a fourth power line; a logic circuit configured to receive the second logic power supply voltage from the fourth power supply line and to control the source drive circuit and the gate control and drive circuit; and a charge transport path. The logic circuit is responsive to a decrease in a voltage level on at least one of the first and second power supply lines for controlling the source line drive circuitry and the gate line drive circuitry to discharge charges accumulated in the display panel. The charge transport path is configured to transport charges from the third power supply line to the fourth power supply line in response to the decrease in the voltage level on the at least one of the first and second power supply lines.

DESCRIPTION OF PREFERRED EMBODIMENTS

For easy understanding of the technical concept of the present invention, a description is first given of an exemplary configuration of a mobile terminal and an example of the operation of a display panel driver in the mobile terminal in the case when an abnormal shutdown occur due to a stop of an electric power supply from an electric power storage device (most typically, a battery).

Figure 1:
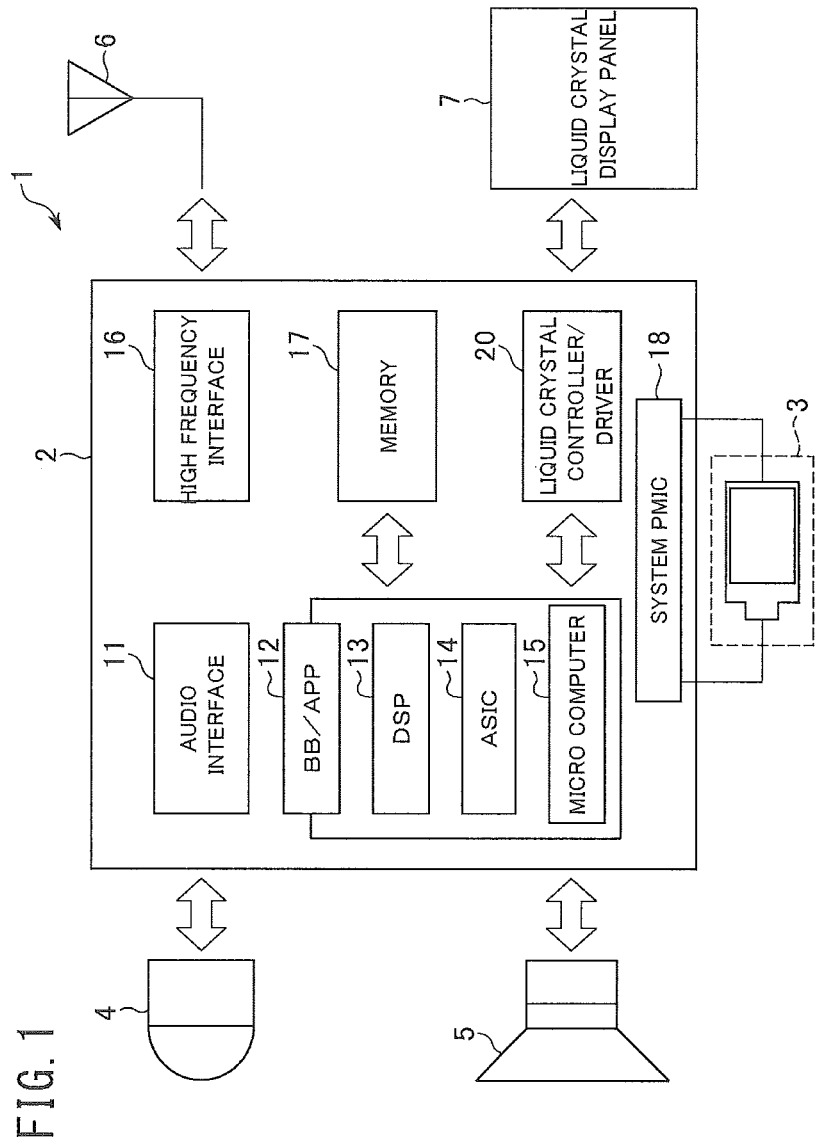
FIG. 1 is a block diagram illustrating an exemplary configuration of a mobile terminal.

FIG. 1 is a block diagram illustrating an example of the configuration of a mobile terminal (such as cellular phones, smart phones and tablet terminals). The mobile terminal, denoted by numeral 1 in FIG. 1, includes a main board 2, a battery 3, a microphone 4, a speaker 5, an antenna module 6 and a liquid crystal display panel 7. Mounted on the main board 2 are a sound interface 11, a baseband/application processor 12, a DSP (digital signal processor) 13, an ASIC (application specific integrated circuit) 14, a micro computer 15, a high frequency interface 16, a memory 17, a system PMIC (Power Management IC) 18 and a liquid crystal controller/driver 20. Here, the liquid crystal controller/driver 20 is a display panel driver which drives the liquid crystal display panel 7, and the liquid crystal display panel 7 and the liquid crystal controller/driver 20 form a display device.

The respective devices mounted on the main board 2 operate on electric power received from the battery 3. In detail, the system PMIC 18 generates a power supply voltage to be supplied to the respective devices on the main board 2 from the electric power received from the battery 3. The system PMIC 18 also has the function of charging the battery 3 when the mobile terminal 1 is connected to an external power supply (for example, a commercial AC power supply).

Figure 2:
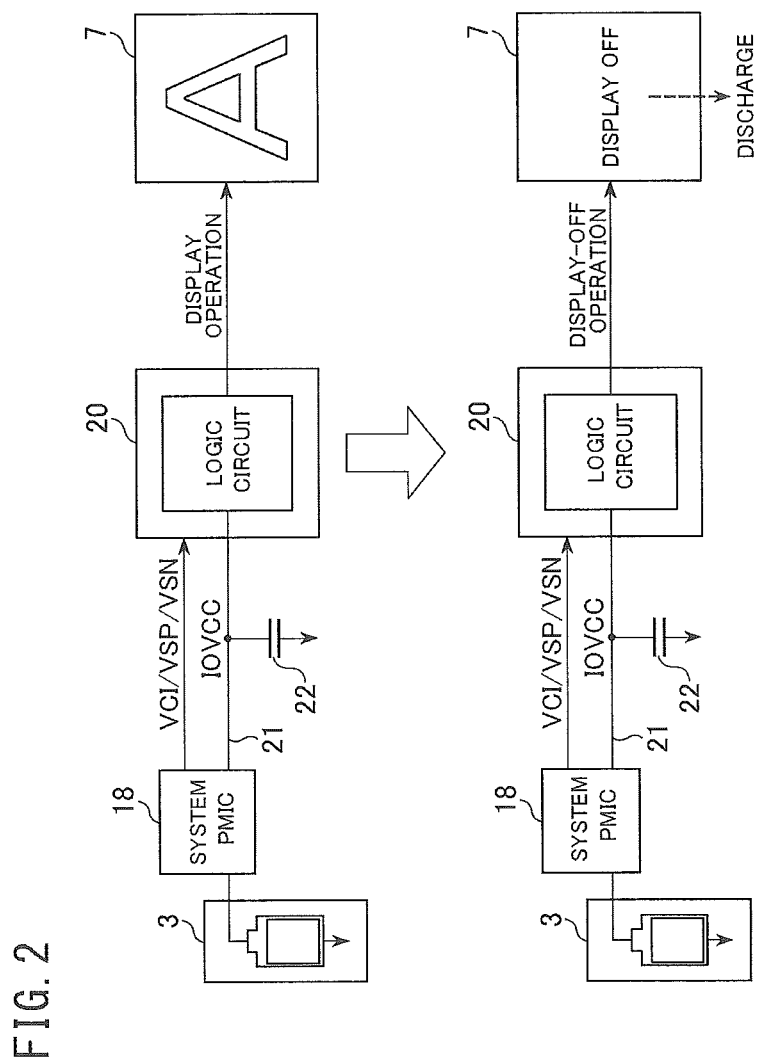
FIG. 2 is a conceptual view illustrating an exemplary operation of a liquid crystal controller/driver 20 of the mobile terminal illustrated in FIG. 1.

FIG. 2 is a conceptual view illustrating an example of the operation of the liquid crystal controller/driver 20 of the mobile terminal 1 illustrated in FIG. 1. When the system of the mobile terminal 1 normally operates, as shown in the upper view of FIG. 2, the system PMIC 18 generates at least one analog power supply voltage and a logic power supply voltage IOVCC, from the electric power received from the battery 3. Here, the analog power supply voltage is used to operate analog circuits of the liquid crystal controller/driver 20 (for example, a power supply circuit, output amplifiers and the like). Illustrated in FIG. 2 is an example in which three analog power supply voltages VCI, VSP and VSN are supplied to the liquid crystal controller/driver 20. The logic power supply voltage IOVCC is, on the other hand, used to operate logic circuits integrated in the liquid crystal controller/driver 20. The liquid crystal controller/driver 20 operates on the analog power supply voltages VCI, VSP and VSN and the logic power supply voltage IOVCC, which are received from the system PMIC 18, and displays desired images on the liquid crystal display panel 7.

When the system of the mobile terminal 1 is normally shut down, the liquid crystal controller/driver 20 carries out an operation for stopping the display on the liquid crystal display panel 7, more specifically, an operation for discharging charges remaining in the liquid crystal display panel 7. For example, the liquid crystal controller/driver 20 sequentially selects the gate lines of the liquid crystal display panel 7 while connecting all of the source lines to the circuit ground; the liquid crystal controller/driver 20 thereby discharges the charges of the respective pixels in the liquid crystal display panel 7. This operation effectively avoids an abnormal display on the liquid crystal display panel 7, (that is, avoids an abnormal image being displayed on the liquid crystal display panel 7). The operation for stopping the display of the liquid crystal display panel 7 is controlled by a logic circuit in the liquid crystal controller/driver 20.

Figure 3:
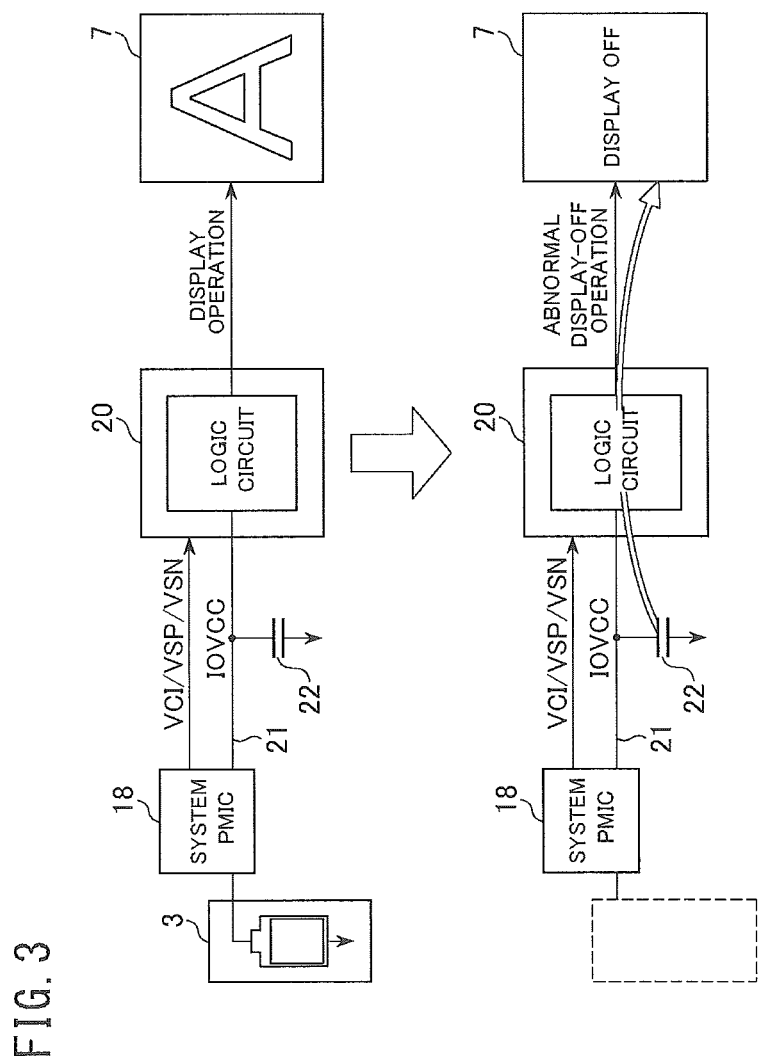
FIG. 3 is a conceptual view illustrating an exemplary operation of a display panel driver when an abnormal shutdown occurs due to a stop of an electric power supply from an electric power storage device (most typically, a battery)

Referring to FIG. 3, the abnormal display of the liquid crystal display panel 7 is desired to be avoided even when a stop of the electric power supply from the battery 3 causes the system of the mobile terminal 1 to be abnormally shut down, for example, when the user removes the battery 3 which operates as an electric power storage device. One issue is that the operation for avoiding the abnormal display of the liquid crystal display panel 7 must be carried out in a situation in which no electric power is supplied from the battery 3 to the liquid crystal controller/driver 20. Although the operation for avoiding the abnormal display of the liquid crystal display panel 7 is controlled by a logic circuit of the liquid crystal controller/driver 20, the logic circuit must be operated in a situation that no electric power is supplied from the battery 3.

As shown in the lower view of FIG. 3, one possible approach is to use the charges accumulated across a bypass capacitor 22 connected to a power line 21 which is used to supply the logic power supply voltage IOVCC to the liquid crystal controller/driver 20. In general, the bypass capacitor 22 is connected between the power line 21 and the circuit ground to stabilize the voltage level on the power line 21. Maintaining the voltage on the power line 21 by using the charges accumulated across the bypass capacitor 22 allows the logic circuit of the liquid crystal controller/driver 20 to operate to avoid the abnormal display of the liquid crystal display panel 7.

In order to completely perform the operation for avoiding the abnormal display of the liquid crystal display panel 7 by using the above-described approach, the bypass capacitor 22 is required to have an increased capacitance, and this may cause an undesired influence on an actual implementation of the mobile terminal 1.

In the following, a description is given of embodiments of the present invention which are directed to a technique for addressing such a problem. Presented in the below-described embodiments of the present invention are techniques for suppressing the occurrence of the abnormal display of the liquid crystal display panel 7, when an abnormal shutdown occurs due to a stop of the electric power supply from the battery 3.

(First Embodiment)

Figure 4:
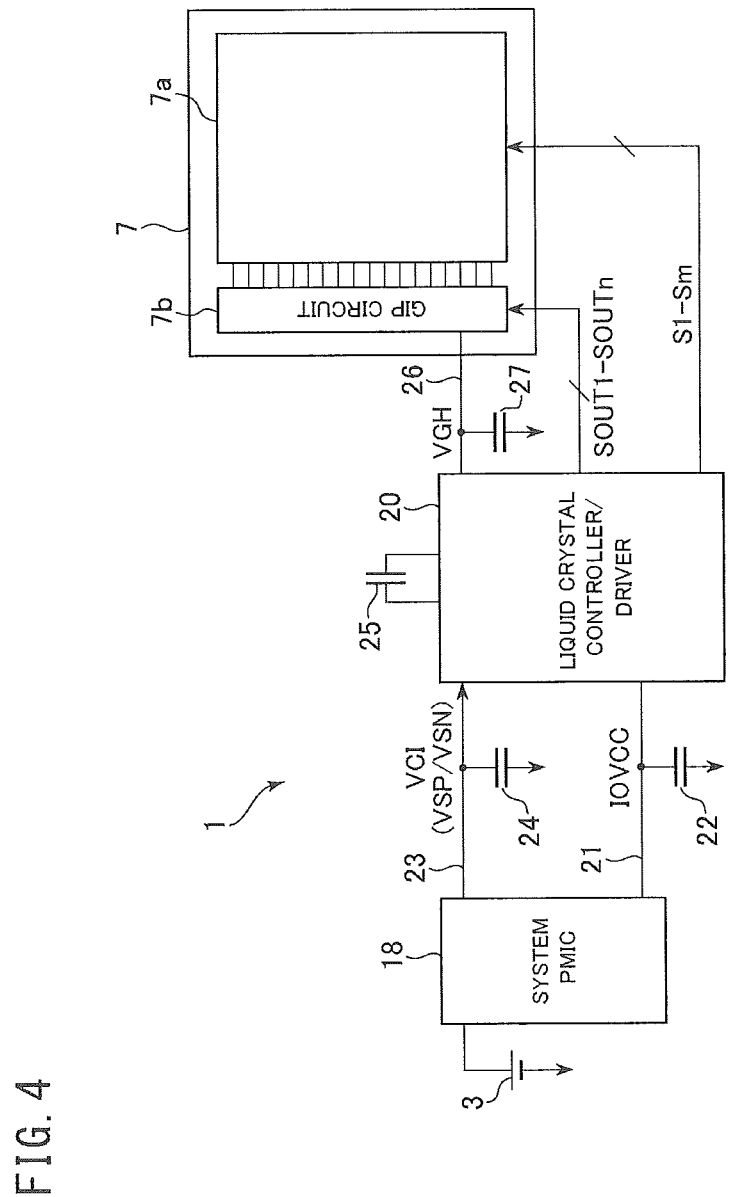
FIG. 4 is a block diagram partially illustrating an exemplary configuration of a mobile terminal in a first embodiment of the present invention.

FIG. 4 is the block diagram illustrating an exemplary configuration of a mobile terminal 1 in a first embodiment of the present invention. It should be noted that FIG. 4 illustrates the configuration of only a relevant portion of the mobile terminal 1 which is related to drive the liquid crystal display panel 7.

A battery 3 is connected to a system PMIC 18. The system PMIC 18 receives electric power from the battery 3 and generates a logic power supply voltage IOVCC and an analog power supply voltage VCI. The logic power supply voltage IOVCC is supplied to a liquid crystal controller/driver 20 via a power line 21, and the analog power supply voltage VCI is supplied to the liquid crystal controller/driver 20 via a power line 23. It should be noted that, although FIG. 4 illustrates only one analog power supply voltage VCI, a plurality of analog power supply voltages (referred to as power supply voltages VSP and VSN in FIG. 4) may be supplied to the liquid crystal controller/driver 20.

A bypass capacitor 22 is connected to the power line 21, which supplies the logic power supply voltage IOVCC to the liquid crystal controller/driver 20, to keep the voltage level on the power line 21. In addition, a bypass capacitor 24 is connected to the power line 23, which supplies the analog power supply voltage VCI to the liquid crystal controller/driver 20, to keep the voltage level on the power line 23. The bypass capacitor 22 is connected between the power line 21 and the circuit ground, and the bypass capacitor 24 is connected between the power line 23 and the circuit ground.

The liquid crystal controller/driver 20 has the function of driving a liquid crystal display panel 7. In detail, the liquid crystal display panel 7 includes: a display area 7a in which source lines (also referred to as signal lines or data lines), gate lines (also referred to as scan lines or address lines) and pixels are arranged; and a GIP circuit 7b which drives the gate lines. The GIP circuit 7b may be integrated on the glass substrate of the liquid crystal display panel 7 by using a COG (circuit on glass) technique.

The liquid crystal controller/driver 20 has the function of driving the source lines of the display area 7a and controlling the GIP circuit 7b. More specifically, the liquid crystal controller/driver 20 supplies source drive signals S1 to Sm to the source lines of the display area 7a to drive the source lines, and further supplies gate control signals SOUT1 to SOUTn to the GIP circuit 7b to control the GIP circuit 7b.

Figure 5:
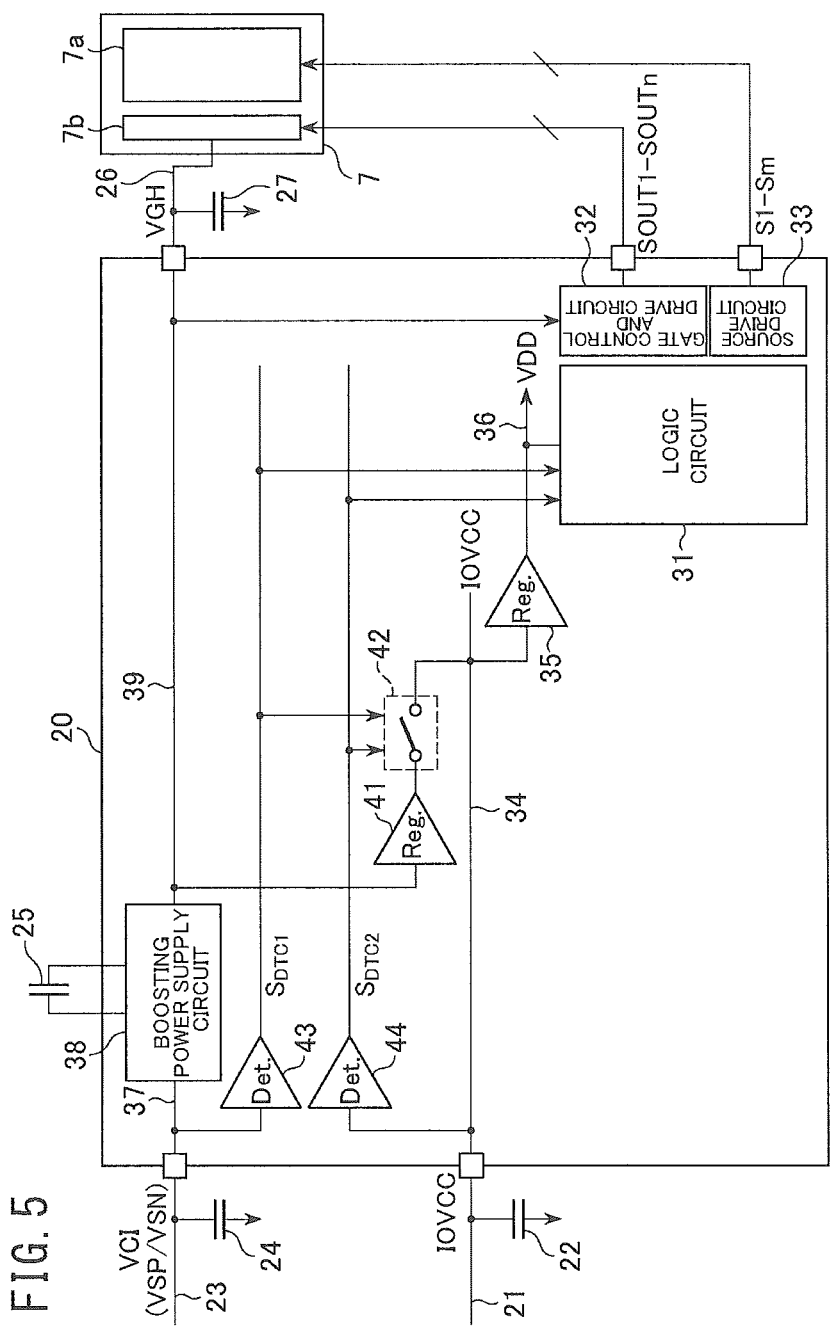
FIG. 5 is a block diagram illustrating an exemplary configuration of a liquid crystal controller/driver in the first embodiment.

FIG. 5 is a block diagram which partially illustrates the configuration of the liquid crystal controller/driver 20 in this embodiment. The liquid crystal controller/driver 20 includes a logic circuit 31, a gate control and drive circuit 32 and a source drive circuit 33. The logic circuit 31 controls the gate control and drive circuit 32 and the source drive circuit 33. The gate control and drive circuit 32 generates the gate control signals SOUT1 to SOUTn to control the GIP circuit 7b. The source drive circuit 33 generates the source drive signals S1 to Sm to drive the source lines. As described later, the logic circuit 31 has the function of controlling the gate control and drive circuit 32 and the source drive circuit 33 so that the charges remaining in the liquid crystal display panel 7 are discharged when an abnormal shutdown occurs due to a stop of the supply of the electric power from the battery 3.

The power supply system which supplies various power supply voltages to the respective circuits in the liquid crystal controller/driver 20 in this embodiment includes an IOVCC power line 34, a regulator 35, a VDD power line 36, a VCI power line 37, a boosting power source circuit 38 and a VGH power line 39.

The IOVCC power line 34 receives the logic power supply voltage IOVCC supplied from the system PMIC 18. The regulator 35 steps down the voltage level of the logic power supply voltage IOVCC to generate a logic power supply voltage VDD and supplies the generated logic power supply voltage VDD to the VDD power line 36. In other words, together with the system PMIC 18, the regulator 35 operates as a power supply circuitry which generates the logic power supply voltage VDD, which is supplied to the VDD power line 36, from the electric power supplied by the battery 3. The logic power supply voltage VDD is supplied to the logic circuit 31 from the VDD power line 36, allowing the logic circuit 31 to operate on the logic power supply voltage VDD.

The VCI power line 37 receives the analog power supply voltage VCI supplied from the system PMIC 18. The boosting power source circuit 38 steps up the voltage level of the analog power supply voltage VCI to generate a boosted power supply voltage VGH. The boosting power source circuit 38 supplies the generated boosted power supply voltage VGH to the VGH power line 39. It should be noted that the boosted power supply voltage VGH is a power supply voltage used to operate a group of circuits which drive the gate lines of the liquid crystal display panel 7 (in this embodiment, the GIP circuit 7b in the liquid crystal display panel 7 and the gate control and drive circuit 32). A boosting capacitor 25, which is used for the boosting operation, is connected to the boosting power source circuit 38. It should be noted that, in this embodiment, the boosting capacitor 25 is mounted as an external capacitor provided outside the liquid crystal controller/driver 20.

In this embodiment, the boosted power supply voltage VGH is supplied to the GIP circuit 7b via a power line 26 and the GIP circuit 7b operates on the boosted power supply voltage VGH. A bypass capacitor 27 is connected to the power line 26 to maintain the voltage level on the power line 26.

It should be noted that the GIP circuit 7b may use one of the gate control signals SOUT1 to SOUTn supplied from the gate control and drive circuit 32 as the power supply voltage, instead of operating on the boosted power supply voltage VGH supplied to the GIP circuit 7b. Also in this case, the bypass capacitor 27 is connected between the VGH power line 39 and the circuit ground to maintain the voltage level on the VGH power line 39.

One feature of the liquid crystal controller/driver 20 of this embodiment is that the logic circuit 31 is operated by using the charges accumulated on the power lines supplied with the power supply voltages to be supplied to the group of circuits which drive the gate lines of the liquid crystal display panel 7, and across bypass capacitors connected to these power lines, when the electric power supply from the battery 3 is stopped. More specifically, the liquid crystal controller/driver 20 in this embodiment is configured such that the logic circuit 31 is operated by using the charges accumulated on the VGH power line 39 and across the bypass capacitor 27, when the electric power supply from the battery 3 is stopped. This allows the logic circuit 31 to operate for certain time duration and to control the gate control and drive circuit 32 and the source drive circuit 33 as to discharge the charges remaining in the liquid crystal display panel 7, even when the electric power supply from the battery 3 is stopped.

In order to attain such operations, the liquid crystal controller/driver 20 in this embodiment includes a regulator 41, a switch 42 and detectors 43 and 44. The regulator 41 is configured to step down the voltage fed from the VGH power line 39 (that is, the boosted power supply voltage VGH) to generate a voltage having the same voltage level as the rated voltage level of the logic power supply voltage IOVCC. The switch 42 is turned on and off in response to a detection signal $S_{DTC1}$ outputted from the detector 43 and a detection signal $S_{DTC2}$ outputted from the detector 44. In other words, the regulator 41 and the switch 42 have the function of a charge transport path which transports the charges from the VGH power line 39 to the IOVCC power line 34 in response to the detection signals $S_{DTC1}$ and $S_{DTC2}$.

The detector 43 detects a decrease in the voltage level on the VCI power line 37, and the detector 44 detects a decrease in the voltage level on the IOVCC power line 34. The detector 43 asserts the detection signal $S_{DTC1}$ when detecting that the voltage level on the VCI power line 37 is lower than a predetermined threshold $V_{TH1}$. When the voltage level on the VCI power line 37 is higher than the threshold level $V_{TH1}$, on the other hand, the detector 43 negates the detection signal $S_{DTC1}$. Similarly, the detector 44 asserts the detection signal $S_{DTC2}$ when detecting that the voltage level on the IOVCC power line 34 is lower than a predetermined threshold level $V_{TH2}$. When the voltage level on the IOVCC power line 34 is higher than the threshold $V_{TH2}$, on the other hand, the detector 44 negates the detection signal $S_{DTC2}$.

The above-described operations of the detectors 43 and 44 aim at detecting a stop of the electric power supply from the battery 3. When the electric power supply from the battery 3 is stopped, the generations of the analog power supply voltage VCI and the logic power supply voltage IOVCC by the system PMIC 18 are also stopped and this results in decreases in the voltage levels on the VCI power line 37 and the IOVCC power line 34. That is, a stop of the electric power supply from the battery 3 can be detected from decreases in the voltage levels on the VCI power line 37 and the IOVCC power line 34.

The detection signals $S_{DTC1}$ and $S_{DTC2}$ generated by the detectors 43 and 44 are used to control the logic circuit 31 and the switch 42. When at least one of the detection signal $S_{DTC1}$ and the detection signal $S_{DTC2}$ is asserted, the switch 42 is turned on to supply the voltage generated by the regulator 41 to the IOVCC power line 34. Also, when at least one of the detection signal $S_{DTC1}$ and the detection signal $S_{DTC2}$ is asserted, the logic circuit 31 starts an operation of controlling the gate control and drive circuit 32 and the source drive circuit 33 to discharge the charges remaining in the liquid crystal display panel 7.

Figure 6:
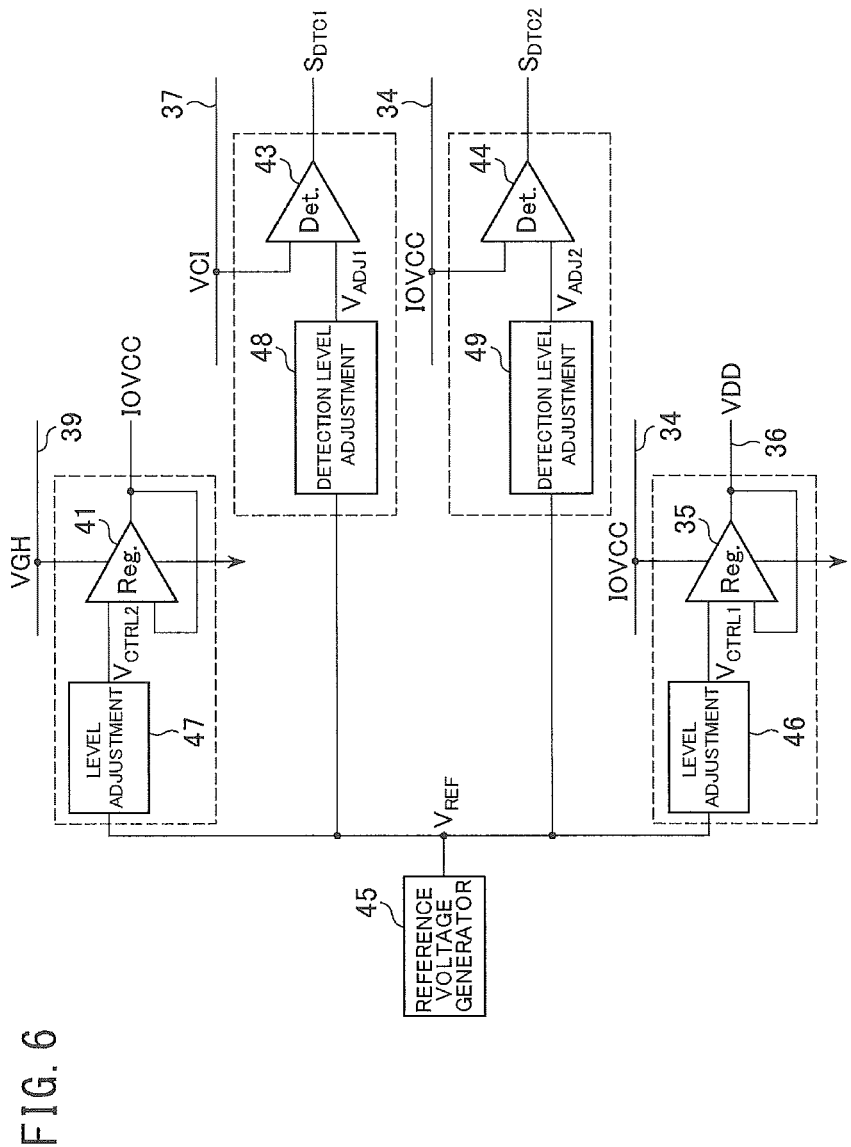
FIG. 6 is a block diagram illustrating an exemplary configuration of a control system which controls operations of regulators and detectors in the liquid crystal controller/driver in the first embodiment.

FIG. 6 is a block diagram illustrating an exemplary configuration of a control system which controls the regulators 35 and 41 and the detectors 43 and 44. This control system includes a reference voltage generator circuit 45, level adjustment circuits 46 and 47 and detection level adjustment circuits 48 and 49. The reference voltage generator circuit 45 generates a stabilized reference voltage $V_{REF}$. For example, a circuit which can stably generate a reference voltage, such as a band gap reference circuit, may be used as the reference voltage generator circuit 45.

The level adjustment circuit 46 adjusts the voltage level of the voltage outputted from the regulator 35. The level adjustment circuit 46 generates a control voltage $V_{CTRL1}$ corresponding to the voltage to be outputted from the regulator 35, from the reference voltage $V_{REF}$ supplied by the reference voltage generator circuit 45. The regulator 35 is configured to control the voltage outputted to the VDD power line 36 to the rated voltage level of the logic power supply voltage VDD, in response to the control voltage $V_{CTRL1}$.

The level adjustment circuit 47 adjusts the voltage level of the voltage outputted from the regulator 41. The level adjustment circuit 47 generates a control voltage $V_{CTRL2}$ corresponding to the voltage to be outputted from the regulator 41, from the reference voltage $V_{REF}$ supplied by the reference voltage generator circuit 45. The regulator 41 is configured to control the output voltage to the rated voltage level of the logic power supply voltage IOVCC, in response to this control voltage $V_{CTRL2}$.

The detection level adjustment circuit 48 adjusts the threshold level $V_{TH1}$ at which the detector 43 asserts the detection signal $S_{DTC1}$. The detection level adjustment circuit 48 generates a voltage $V_{ADJ1}$ corresponding to the threshold level $V_{TH1}$ at which the detector 43 asserts the detection signal $S_{DTC1}$, from the reference voltage $V_{REF}$ supplied from the reference voltage generator circuit 45. The detector 43 compares the voltage of the VCI power line 37 with the voltage $V_{ADJ1}$. If the voltage of the VCI power line 37 is lower than the threshold level $V_{TH1}$ the detector 43 asserts the detection signal $S_{DTC1}$. It should be noted that, when the voltage of the VCI power line 37 is directly compared with the voltage $V_{ADJ1}$, the voltage $V_{ADJ1}$ is set equal to the threshold level $V_{TH1}$. When a voltage obtained by voltage-dividing of the voltage on the VCI power line 37 is compared with the voltage $V_{ADJ1}$, the voltage $V_{ADJ1}$ is set depending on the ratio of the voltage dividing.

The detection level adjustment circuit 49 is the circuit for adjusting the threshold level at which the detector 44 asserts the detection signal $S_{DTC2}$. The detection level adjustment circuit 49 generates a voltage $V_{ADJ2}$ corresponding to the threshold level $V_{TH2}$ at which the detector 44 asserts the detection signal $S_{DTC2}$, from the reference voltage $V_{REF}$ supplied from the reference voltage generator circuit 45. The detector 44 compares the voltage of the IOVCC power line 34 with the voltage $V_{ADJ2}$. If the voltage of the IOVCC power line 34 is lower than the threshold $V_{TH2}$, the detector 44 asserts the detection signal $S_{DTC2}$. It should be noted that, when the voltage of the IOVCC power line 34 is directly compared with the voltage $V_{ADJ2}$, the voltage $V_{ADJ2}$ is set equal to the threshold level $V_{TH2}$. When a voltage obtained by voltage-dividing of the voltage on the IOVCC power line 34 is compared with the voltage $V_{ADJ2}$, the voltage $V_{ADJ2}$ is set to a voltage depending on the ratio of the voltage dividing.

Figure 7:
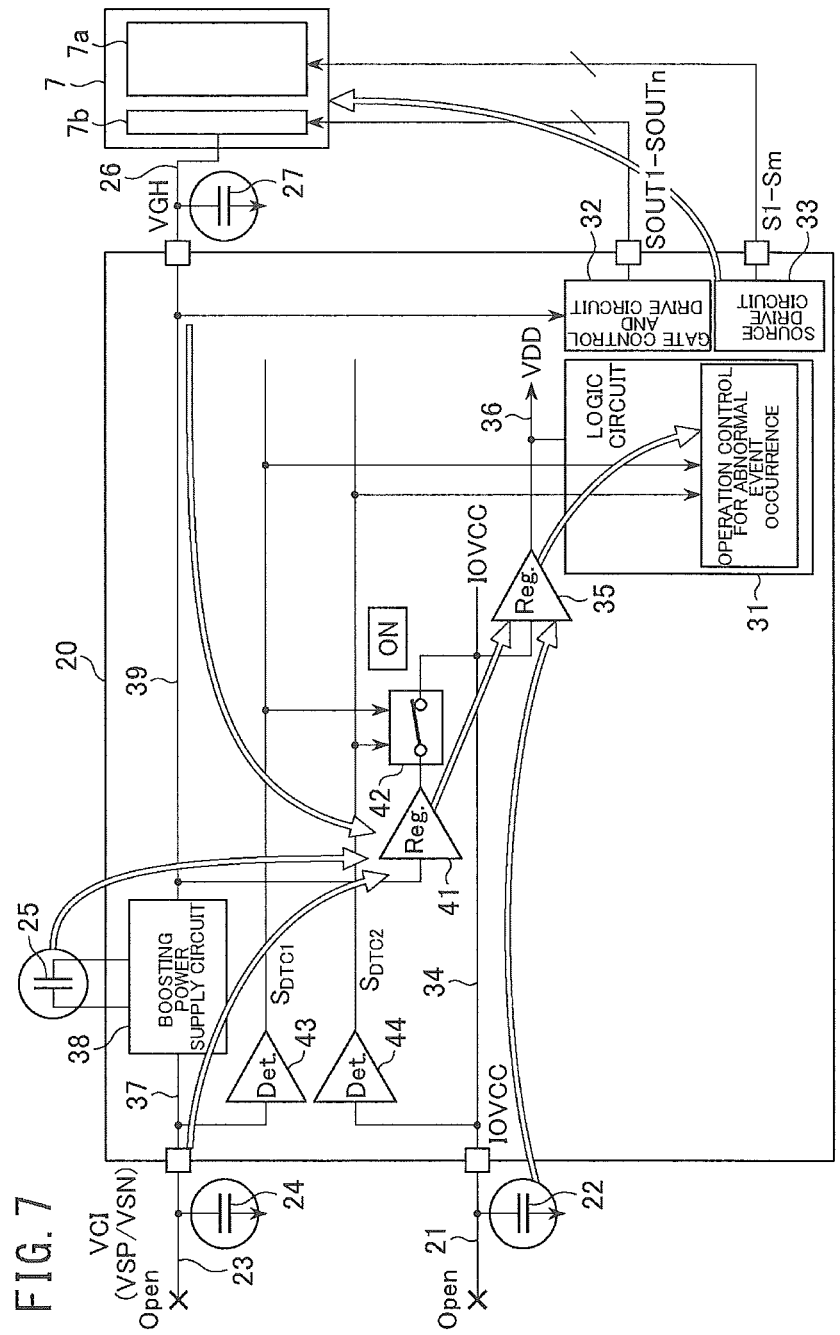
FIG. 7 is a conceptual view illustrating an exemplary operation of the liquid crystal controller/driver when an electric power supply from a battery is stopped, in the first embodiment.

FIG. 7 is a conceptual view illustrating an exemplary operation of the liquid crystal controller/driver 20 of this embodiment, when an abnormal shutdown occurs due to a stop of the electric power supply from the battery 3. When the electric power supply from the battery 3 is stopped, the generations of the analog power supply voltage VCI and the logic power supply voltage IOVCC by the system PMIC 18 are also stopped, and this results in decreases in the voltage levels on the VCI power line 37 and the IOVCC power line 34. The detector 43 asserts the detection signal $S_{DTC1}$ when the voltage level on the VCI power line 37 becomes lower than the threshold level $V_{TH1}$, and the detector 44 asserts the detection signal $S_{DTC2}$ when the voltage of the IOVCC power line 34 becomes lower than the threshold level $V_{TH2}$.

When at least one of the detection signals $S_{DTC1}$ and $S_{DTC2}$ is asserted, the logic circuit 31 judges that the electric power supply from the battery 3 is stopped, and starts the operation for controlling the gate control and drive circuit 32 and the source drive circuit 33 to discharge the charges remaining in the liquid crystal display panel 7. For example, the logic circuit 31 controls the gate control and drive circuit 32 so that all of the gate lines of the liquid crystal display panel 7 are selected, and also starts the operation for controlling the source drive circuit 33 so that all of the source lines are connected to the ground terminal. This operation effectively discharges the charges accumulated in the liquid crystal display panel 7.

In addition, the switch 42 is turned on in response to the assertion of at least one of the detection signals $S_{DTC1}$ and $S_{DTC2}$. The voltage generated by the regulator 41 is supplied to the IOVCC power line 34 in response to the turn-on of the switch 42. In other words, the regulator 41 starts to feed the charges received from the VGH power line 39 to the IOVCC power line 34.

This operation allows using the charges accumulated on the VGH power line 39 and the power line 26 and across the bypass capacitor 27 as well as the charges accumulated on the power line 21 and the IOVCC power line 34 and across the bypass capacitor 22 to maintain the voltage level on the VDD power line 36, when the electric power supply from the battery 3 is stopped.

Moreover, the following charges can be also used to maintain the voltage level on the VDD power line 36:
(1) charges accumulated on the power line 23,
(2) charges accumulated across the bypass capacitor 24,
(3) charges accumulated on the VCI power line 37, and
(4) charges accumulated across the boosting capacitor 25.

More specifically, when the electric power supply from the battery 3 is stopped, the charges accumulated on the power line 23 and the VCI power line 37 and across the bypass capacitor 24 and the boosting capacitor 25 are fed to the VGH power line 39. Here, the charges fed to the VGH power line 39 are fed to the VDD power line 36 through the regulator 41, the switch 42 and the regulator 35 in this embodiment, and accordingly the charges of the above-described (1) to (4) can be used to maintain the voltage level on the VDD power line 36.

As a result, the time duration during which the logic power supply voltage VDD supplied from the VDD power line 36 to the logic circuit 31 is kept in a voltage range in which the logic circuit 31 can operate. This allows the logic circuit 31 to completely perform the operation of controlling the gate control and drive circuit 32 and the source drive circuit 33 to discharge the charges remaining in the liquid crystal display panel 7.

As thus described, the configuration of the liquid crystal controller/driver 20 of this embodiment allows effectively using the charges accumulated on various power line and across various capacitors to maintain the operation of the logic circuit 31, when the electric power supply from the battery 3 is stopped. Accordingly, it is possible to suppress the occurrence of an abnormal display on the liquid crystal display panel 7 in this embodiment when an abnormal shutdown occurs due to a stop of the electric power supply from the battery 3.

Figure 8:
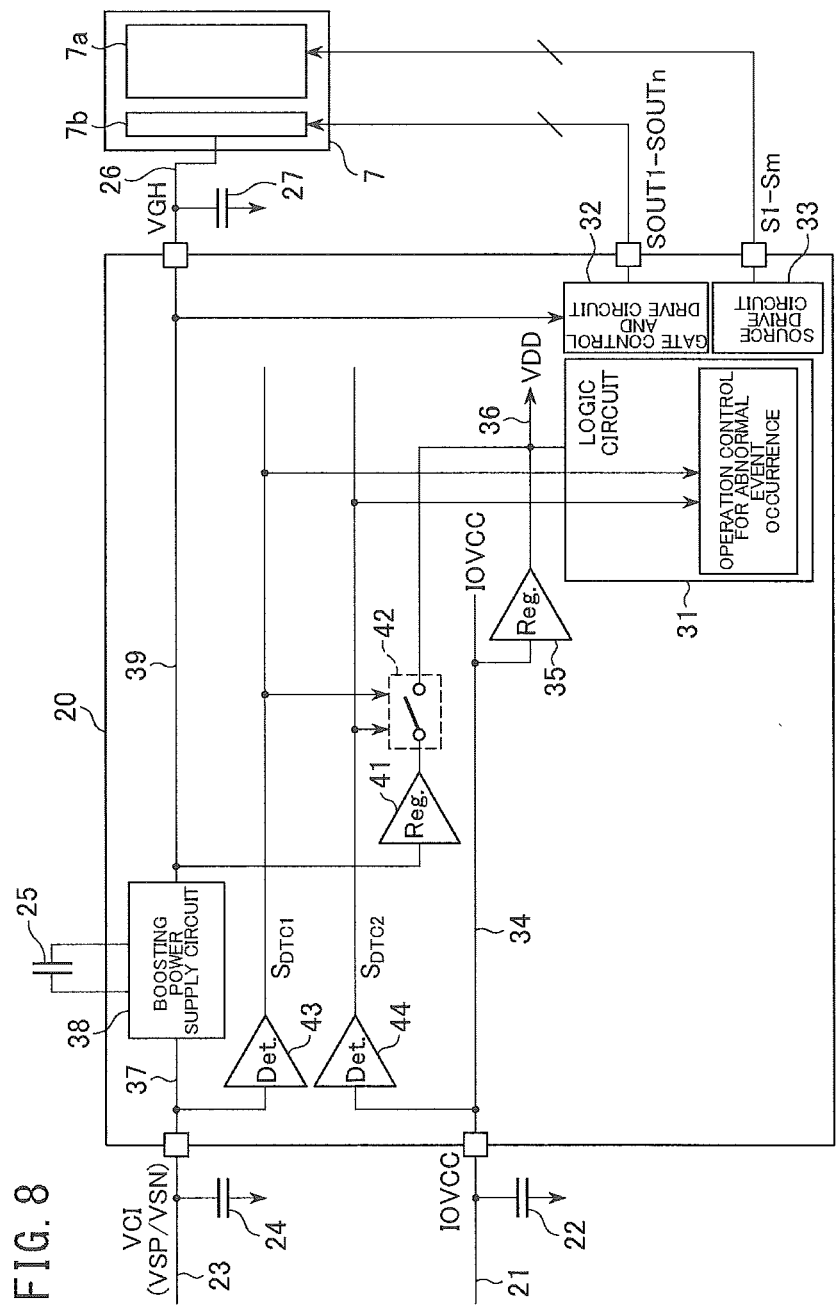
FIG. 8 is a block diagram illustrating an example of modification in the configuration of the liquid crystal controller/driver in the first embodiment.

It should be noted that, although the output of the regulator 41 is connected to the IOVCC power line 34 via the switch 42 in the above-described embodiment, the output of the regulator 41 may be connected to the VDD power line 36 via the switch 42, as illustrated in FIG. 8. In this case, the regulator 41 is configured to step down the voltage on the VGH power line 39 (the boosted power supply voltage VGH) to generate a voltage having a voltage level equal to the rated voltage level of the logic power supply voltage VDD. Even such configuration allows feeding the charges accumulated on the VGH power line 39 and the power line 26 and across the bypass capacitor 27 to the VDD power line 36 to maintain the voltage level on the VDD power line 36.

Furthermore, although two detectors 43 and 44 are used to control the logic circuit 31 and the switch 42 in this embodiment, only one of the detectors 43 and 44 may be used. In this case, the logic circuit 31 and the switch 42 are operated in response to the detection signal ($S_{DTC1}$ or $S_{DTC2}$) outputted from this one detector (the detector 43 or the detector 44). When the detection signal outputted by this one detector is asserted, the logic circuit 31 judges that the electric power supply from the battery 3 is stopped, and starts the operation of controlling the gate control and drive circuit 32 and the source drive circuit 33 so to discharge the charges remaining in the liquid crystal display panel 7. At this moment, the switch 42 is turned on, and the voltage generated by the regulator 41 is supplied to the IOVCC power line 34 or the VDD power line 36.

(Second Embodiment)

Figure 9:
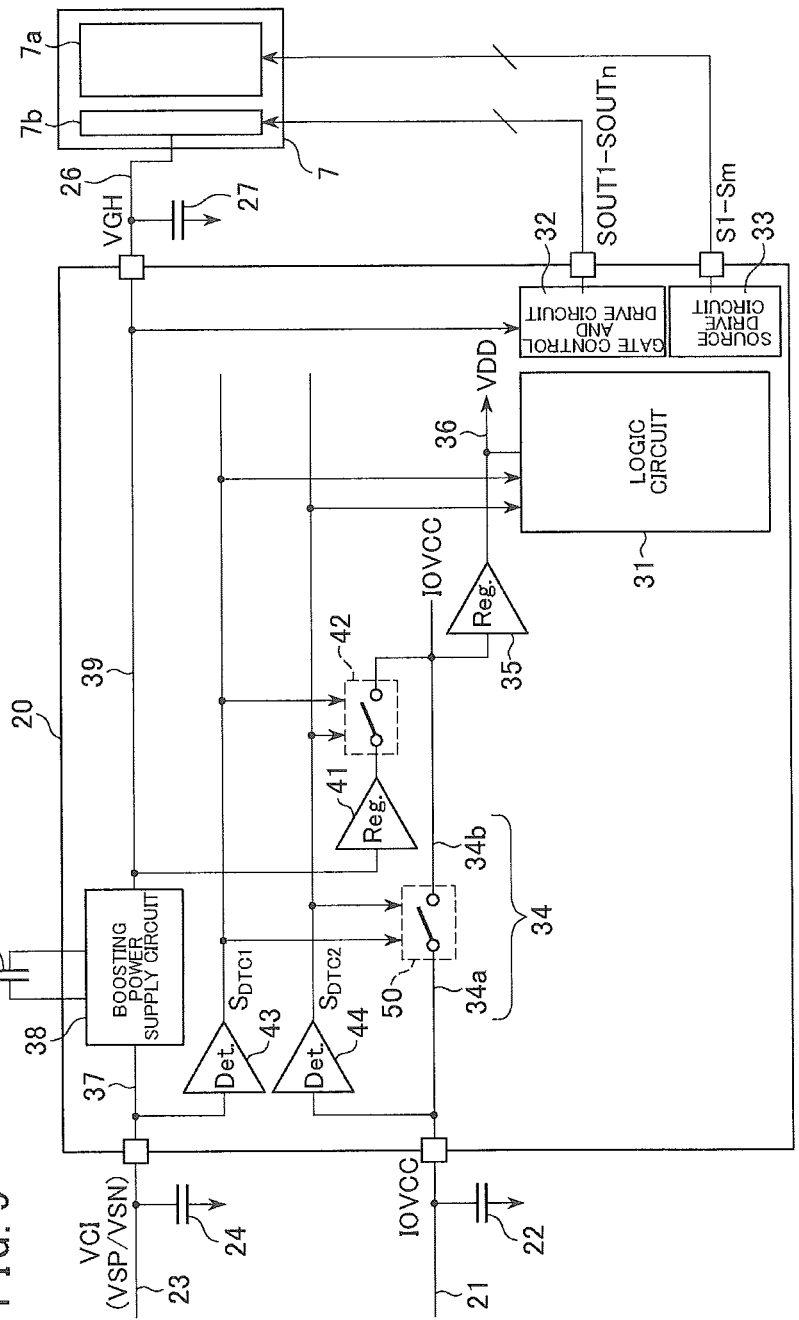
FIG. 9 is a block diagram illustrating an exemplary configuration of a liquid crystal controller/driver in a second embodiment.
Figure 10:
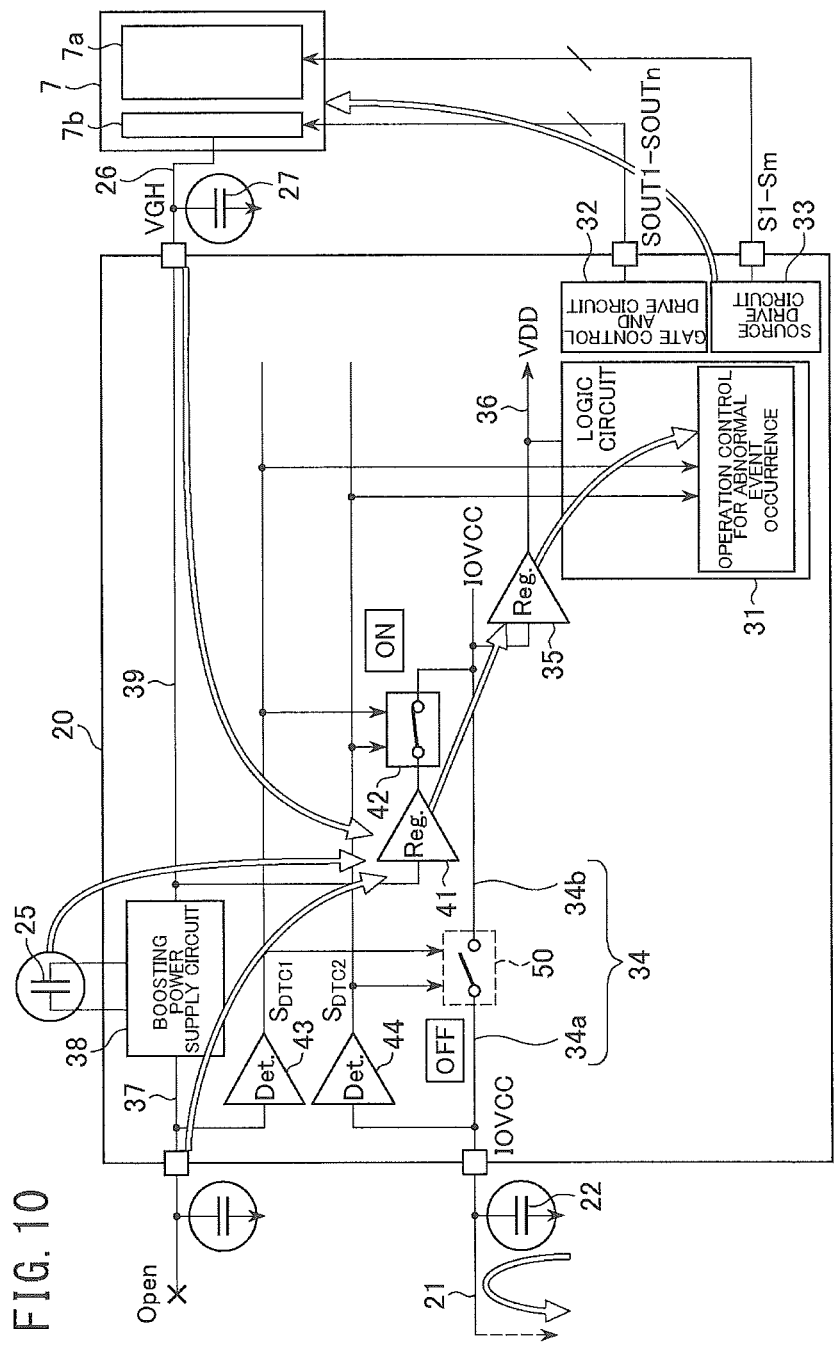
FIG. 10 is a conceptual view illustrating an exemplary operation of the liquid crystal controller/driver when the electric power supply from the battery is stopped, in the second embodiment.

FIG. 9 is a block diagram illustrating an exemplary configuration of the liquid crystal controller/driver 20 in a second embodiment of the present invention. The configuration of the liquid crystal controller/driver 20 in the second embodiment is similar to that in the first embodiment (refer to FIG. 5); the difference is that the liquid crystal controller/driver 20 in the second embodiment additionally includes a switch 50 inserted in the IOVCC power line 34.

More specifically, the IOVCC power line 34 includes first and second segments 34a and 34b, and the switch 50 is connected between the first and second segments 34a and 34b. The first segment 34a is connected to the power line (the power line through which the logic power supply voltage IOVCC is supplied to the liquid crystal controller/driver 20 from the system PMIC 18). The second segment 34b is connected to the regulator 35. The input of the detector 44 is connected to the first segment 34a and the output of the regulator 41 is connected through the switch 42 to the second segment 34b.

The switch 50 operates in response to the detection signals $S_{DTC1}$ and $S_{DTC2}$ outputted from the detectors 43 and 44. When both of the detection signals $S_{DTC1}$ and $S_{DTC2}$ are negated, the switch 50 is turned on to provide an electrical connection between the first and second segments 34a and 34b. In this case, the power line 21 is electrically connected to the regulator 35 (and the VDD power line 36). When at least one of the detection signals $S_{DTC1}$ and $S_{DTC2}$ is asserted, on the other hand, the switch 50 is turned off, and the first and second segments 34a and 34b are electrically disconnected. In this case, the power line 21 is electrically disconnected from the regulator 35 (and the VDD power line 36).

The switch 50 is directed to electrically disconnect the power line 21 from the regulator 35 and the VDD power line 36 when an abnormal shutdown occurs due to a stop of the electric power supply from the battery 3. The system of the mobile terminal 1 may be designed to discharge the power line 21 and the bypass capacitor 22, when an abnormal shutdown occurs due to a stop of the electric power supply from the battery 3. In this case, if the power line 21 is electrically connected to the regulator 35 (and the VDD power line 36), the charges accumulated on the VDD power line 36 are discharged through the power line 21, and the voltage level on the VDD power line 36 is consequently decreased. The decrease in the voltage level on the VDD power line 36 prevents the logic circuit 31 from carrying out the operation of discharging the charges remaining in the liquid crystal display panel 7. The switch 50 avoids the charges on the VDD power line 36 being discharged via the power line 21 by electrically disconnecting the power line 21 from the regulator 35 and the VDD power line 36.

In the following, a description is given of an exemplary operation of the liquid crystal controller/driver 20 in the second embodiment. In the normal operation, the system PMIC 18 supplies the analog power supply voltage VCI and the logic power supply voltage IOVCC to the liquid crystal controller/driver 20 and therefore the detection signals $S_{DTC1}$ and $S_{DTC2}$ outputted from the detectors 43 and 44 are both negated. In response to the negations of the detection signals $S_{DTC1}$ and $S_{DTC2}$, the switch 50 is turned on, and the power line 21 is electrically connected to the regulator 35 (and the VDD power line 36). As this result, the logic power supply voltage IOVCC is supplied from the system PMIC 18 to the regulator 35, and the logic power supply voltage IOVCC is supplied from the regulator 35 to the logic circuit 31. The logic circuit 31 operates on the logic power supply voltage VDD.

When the electric power supply from the battery 3 is stopped, the generations of the analog power supply voltage VCI and the logic power supply voltage IOVCC by the system PMIC 18 are also stopped, and this results in decreases in the voltage levels on the VCI power line 37 and the IOVCC power line 34. The detection signal $S_{DTC1}$ is asserted by the detector 43 when the voltage level on the VCI power line 37 becomes lower than the threshold level $V_{TH1}$ and the detection signal $S_{DTC2}$ is asserted by the detector 44 when the voltage level on the IOVCC power line 34 becomes lower than the threshold level $V_{TH2}$.

When at least one of the detection signals $S_{DTC1}$ and $S_{DTC2}$ is asserted, the logic circuit 31 judges that the electric power supply from the battery 3 is stopped, and starts the operation of controlling the gate control and drive circuit 32 and the source drive circuit 33 to discharge the charges remaining in the liquid crystal display panel 7. For example, the logic circuit 31 controls the gate control and drive circuit 32 so that all of the gate lines of the liquid crystal display panel 7 are selected, and also controls the source drive circuit 33 so that all of the source lines are connected to the ground terminal. This operation allows discharging the charges accumulated in the liquid crystal display panel 7.

Furthermore, the switch 42 is turned on in response to the assertion of at least one of the detection signals $S_{DTC1}$ and $S_{DTC2}$. Since the switch 42 is turned on, the voltage generated by the regulator 41 is supplied to the IOVCC power line 34. In other words, the regulator 41 feeds the charges received from the VGH power line 39 to the IOVCC power line 34.

At this moment, the switch 50 is turned off in response to the assertion of at least one of the detection signals $S_{DTC1}$ and $S_{DTC2}$ and electrically disconnects the power line 21 from the regulator 35 and the VDD power line 36. This operation of the switch 50 effectively avoids the charges on the VDD power line 36 being discharged through the power line 21, even in the case when the charges on the power line 21 and across the bypass capacitor 22 are discharged by the system of the mobile terminal 1.

Such operations allows using the charges accumulated on the VGH power line 39 and the power line 26 and across the bypass capacitor 27 to maintain the voltage level on the VDD power line 36 when the electric power supply from the battery 3 is stopped. Furthermore, the charges accumulated on the power line 23, the charges accumulated across the bypass capacitor 24, the charges accumulated on the VCI power line 37 and the charges accumulated across the boosting capacitor 25 can be also used to maintain the voltage level on the VDD power line 36.

As a result, the time duration during which the logic power supply voltage VDD supplied to the logic circuit 31 from the VDD power line 36 is kept in the range in which the logic circuit 31 can operate is extended, and this allows the logic circuit 31 to completely carry out the operation of controlling the gate control and drive circuit 32 and the source drive circuit 33 to discharge the charges remaining in the liquid crystal display panel 7.

As described above, the configuration of the liquid crystal controller/driver 20 of this embodiment allows effectively using the charges accumulated on various power lines and across various capacitors to maintain the operation of the logic circuit 31, when the electric power supply from the battery 3 is stopped. Accordingly, it is possible to suppress the occurrence of an abnormal display on the liquid crystal display panel 7 also in this embodiment, when an abnormal shutdown occurs due to a stop of the electric power supply from the battery 3.

It should be noted that, also in this embodiment, the output of the regulator 41 may be connected to the VDD power line 36 via the switch 42, as is the case with the configuration illustrated in FIG. 8. Furthermore, only one of the detectors 43 and 44 may be used in this embodiment, as is the case with the first embodiment.

(Specific Example of Actual Implementation)

Figure 11A:
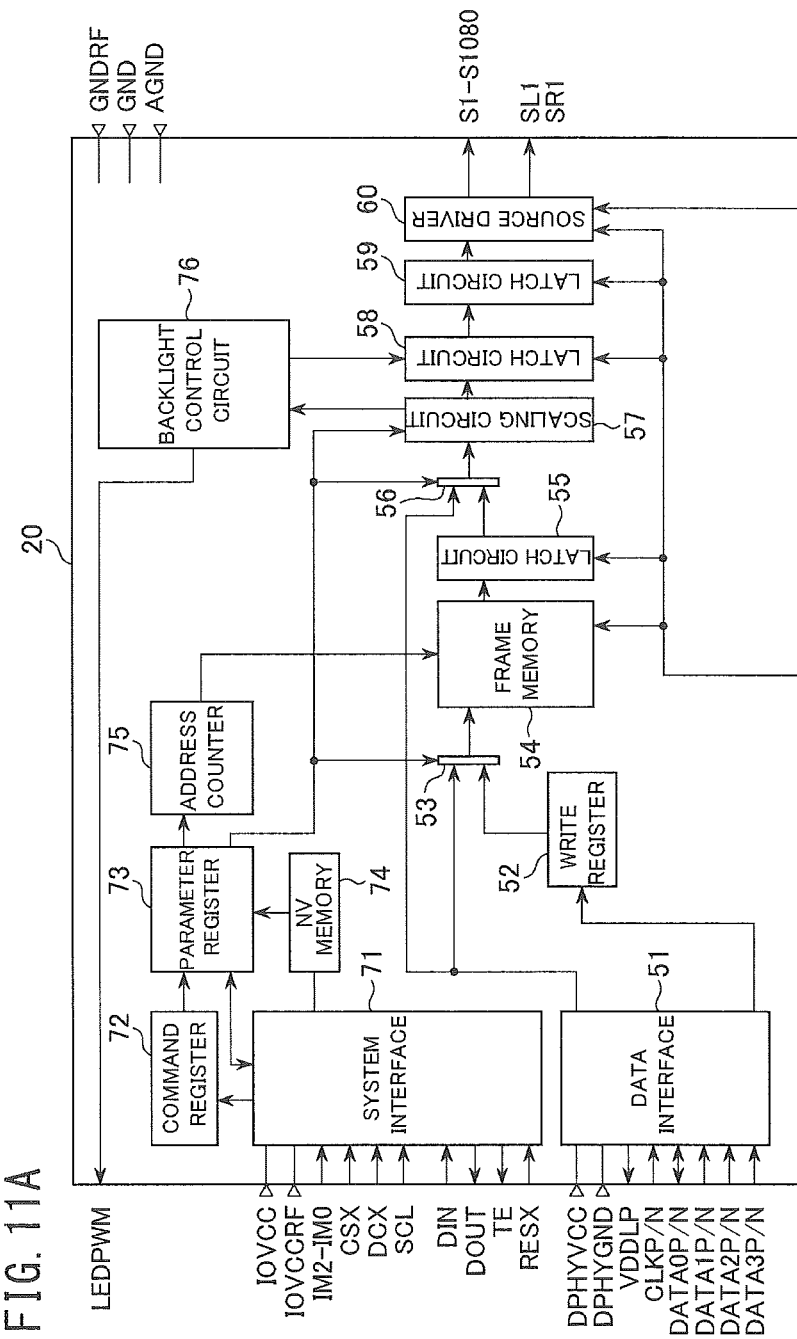
FIGS. 11A and 11B are block diagrams illustrating a specific example of an actual implementation of the liquid crystal controller/driver.
Figure 11B:
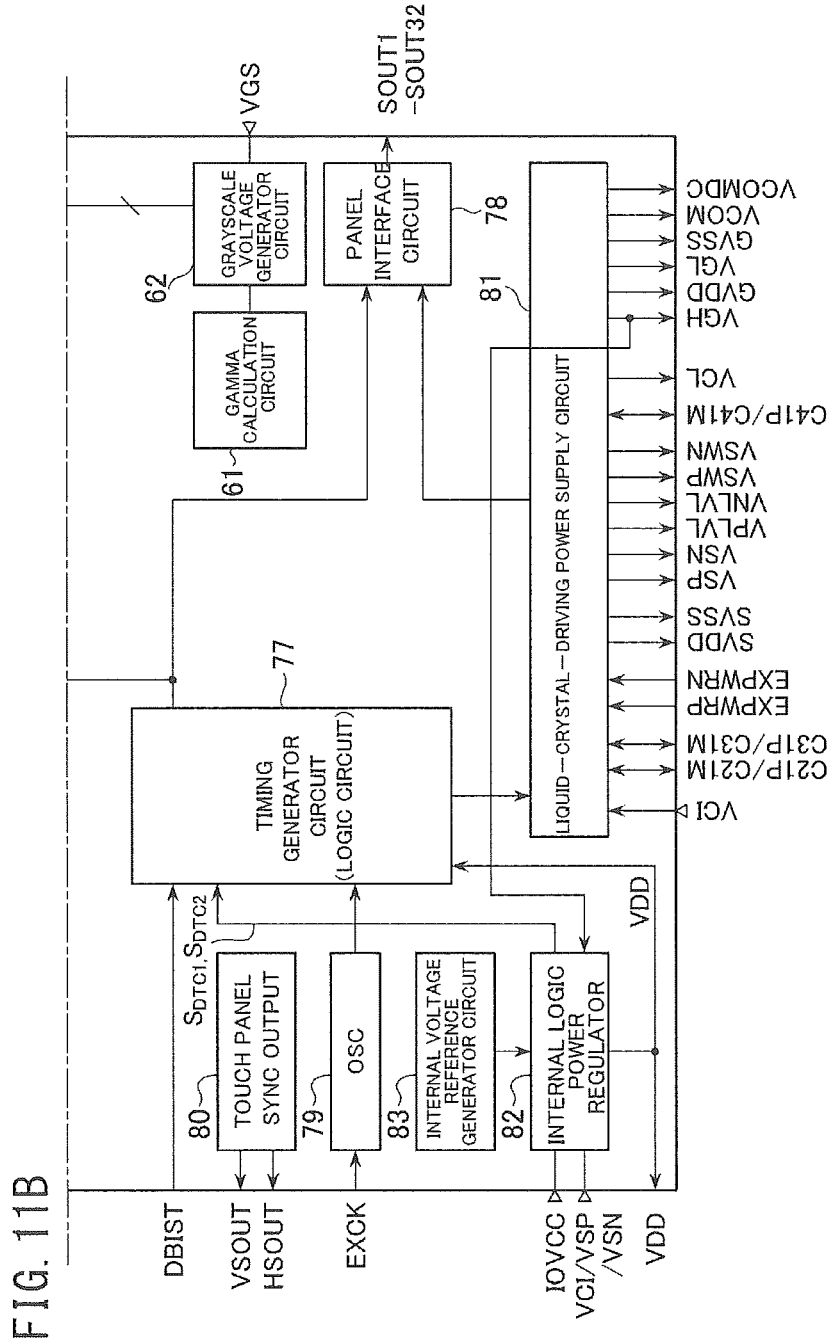

FIG. 11A and FIG. 11B are block diagrams illustrating an exemplary actual implementation of the liquid crystal controller/driver 20 in the first and second embodiments described above. Overall, the liquid crystal controller/driver 20 illustrated in FIG. 11A and FIG. 11B includes a source drive circuitry (51 to 62), an operation control circuitry (71 to 80) and a power supply circuitry (81 to 83).

The source drive circuitry includes a group of circuits which generate source drive signals S1 to S1080, and includes a data interface 51, a write register 52, a selector 53, a frame memory 54, a latch circuit 55, a selector 56, a scaling circuit 57, latch circuits 58 and 59, a source driver 60, a gamma calculation circuit 61 and a grayscale voltage generator circuit 62.

Schematically, the respective circuits in the source drive circuitry operate as follows: The data interface 51 externally receives image data DIN corresponding to images to be displayed. The write register 52 temporally stores the image data to be written into the frame memory 54. The selector 53 selectively connects the input of the frame memory 54 to one of the data interface 51 and the write register 52. The frame memory 54 stores the image data DIN. The latch circuit 55 reads out the image data of pixels of one horizontal line (pixels connected to one gate line) from the frame memory 54. The selector 56 selectively connects the input of the scaling circuit 57 to one of the data interface 51 and the latch circuit 55. The scaling circuit 57 carries out image processing for enlarging or contracting the images to be displayed. The latch circuits 58 and 59 temporally store the image data received from the scaling circuit 57. The source driver 60 generates the source drive signals S1 to S1080, in response to the image data received from the latch circuit 59. The source driver 60 is a component corresponding to the source drive circuit 33.

The operation control circuitry includes a system interface 71, a command register 72, a parameter register 73, a non-volatile memory 74, an address counter 75, a backlight control circuit 76, a timing generator circuit 77, a panel interface circuit 78, an oscillator circuit 79 and a touch panel synchronization output circuit 80.

Schematically, the respective circuits of the operation control circuitry operate as follows: The system interface 71 transmits and receives control signals and control data to and from an external device. The command register 72 holds control commands supplied from the external device. The parameter register 73 holds various register values used to control the liquid crystal controller/driver 20. The non-volatile memory 74 stores the register values to be stored in a non-volatile manner, out of the register values set to the parameter register 73. The address counter 75 generates an address used to access the frame memory 54. The backlight control circuit 76 generates a control signal for controlling a backlight (that is not shown).

The timing generator circuit 77 carries out the overall timing control of the liquid crystal controller/driver 20. The panel interface circuit 78 generates gate control signals SOUT1 to SOUT32 that are supplied to the GIP circuit 7b in the liquid crystal display panel 7. It should be noted that the timing generator circuit 77 has the function of controlling the source driver 60 and the panel interface circuit 78. The logic circuit 31 in the above-described embodiments is integrated in the timing generator circuit 77. Also, the panel interface circuit 78 is a component corresponding to the above-described gate control and drive circuit 32.

The touch panel synchronization output circuit 80 generates a synchronous signal to be transmitted to a group of circuits which drive a touch panel and carry out a detection process of the touch panel.

The power supply circuitry includes a liquid-crystal-driving power supply circuit 81, an internal logic power regulator 82 and an inner reference voltage generation circuit 83. The liquid-crystal-driving power supply circuit 81 receives the analog power supply voltage VCI to generate various power supply voltages used in the liquid crystal controller/driver 20. The boosting power source circuit 38 in the above-described embodiments is integrated in the liquid-crystal-driving power supply circuit 81. That is, the boosted power supply voltage VGH, which is supplied to the group of circuits which drive the source lines, is generated by the liquid-crystal-driving power supply circuit 81. The internal logic power regulator 82 includes a group of circuits which generate the logic power supply voltage VDD. The regulator 35, the regulator 41, the switch 42, the detectors 43 and 44 and the switch 50 in the above-described embodiments are integrated in the internal logic power regulator 82. The detection signals $S_{DTC1}$ and $S_{DTC2}$ generated by the detectors 43 and 44 are supplied from the internal logic power regulator 82 to the timing generator circuit 77. The timing generator circuit 77 (namely, the logic circuit 31) carries out the operation of controlling the gate control and drive circuit 32 and the source drive circuit 33 to discharge the charges remaining in the liquid crystal display panel 7 in response to the supplied detection signals $S_{DTC1}$ and $S_{DTC2}$.

Although various embodiments of the present invention have been specifically described in the above, the present invention is not limited to the above-described embodiments. It would be apparent to a person skilled in the art that the present invention may be implemented with various modifications.

Figure 12:
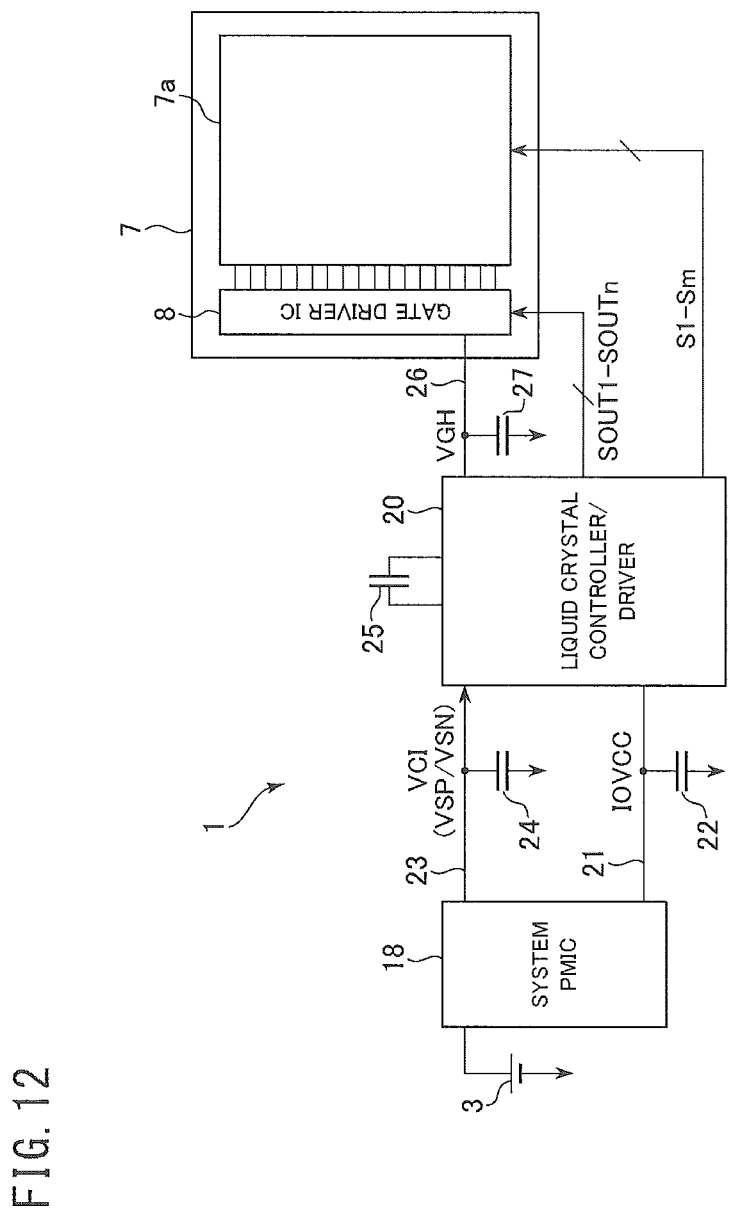
FIG. 12 is a block diagram illustrating an example of modification in the configuration for driving gate lines in the first and second embodiments.
Figure 13:
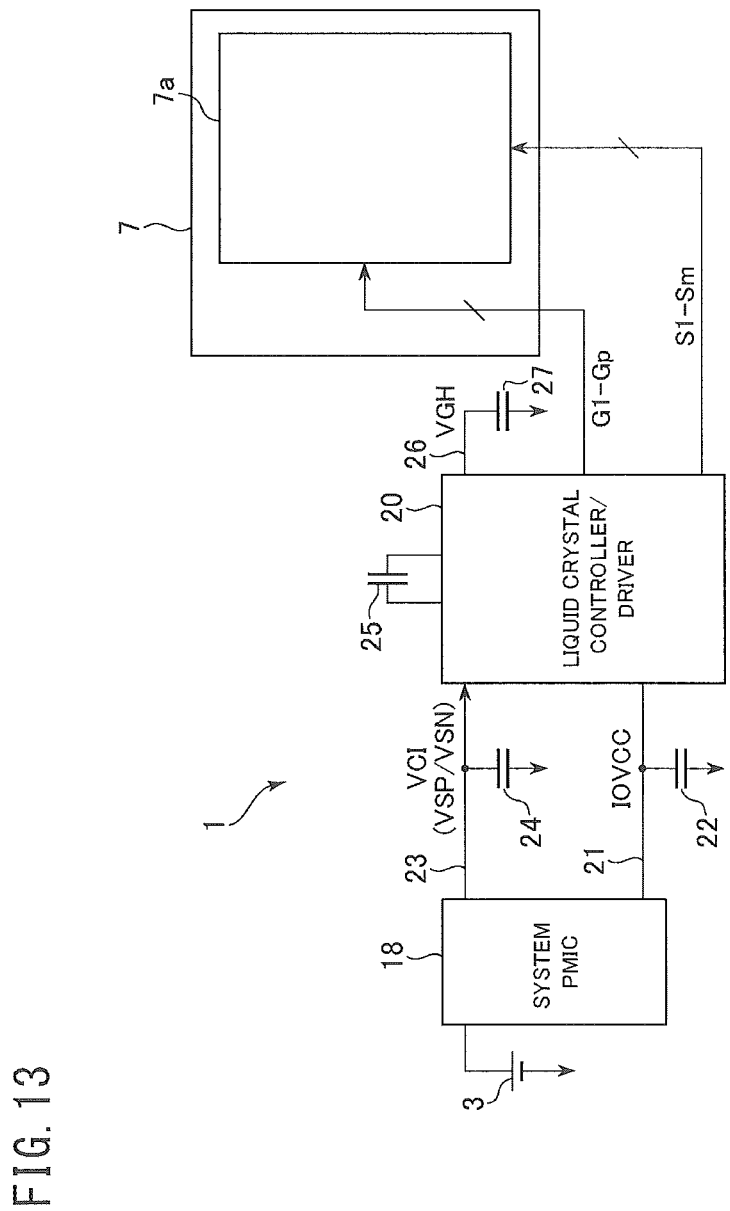
FIG. 13 is a block diagram illustrating another example of modification in the configuration for driving the gate lines in the first and second embodiments.

It should be especially noted that the configurations of the group of circuits which drive the gate lines may be variously modified. Although FIG. 4 illustrates the configuration in which the GIP circuit 7b, which drives the gate lines, is integrated in the liquid crystal display panel 7 and the liquid crystal controller/driver 20 supplies the gate control signals SOUT1 to SOUTn to the GIP circuit 7b, a gate driver IC 8 which is a semiconductor chip in which a gate driver is integrated may be mounted on the liquid crystal display panel 7 as shown in FIG. 12. In this case, the gate control signals SOUT1 to SOUTn are supplied to the gate driver IC 8 and the gate driver IC 8 drives the gate lines of the display area 7a in response to the supplied gate control signals SOUT1 to SOUTn. Alternatively, as shown in FIG. 13, the gate lines of the display area 7a in the liquid crystal display panel 7 may be directly driven by the liquid crystal controller/driver 20. In this case, the gate control and drive circuit 32 supplies gate drive signals G1 to Gp to the respective gate lines to drive the gate lines, instead of supplying the gate control signals SOUT1 to SOUTn.

In both configurations illustrated in FIG. 12 and FIG. 13, the charges accumulated on power lines to which the power supply voltages supplied to the group of circuits which drive the gate lines of the liquid crystal display panel 7 are supplied, and the charges accumulated across the bypass capacitors (in this embodiment, the VGH power line 39 and the bypass capacitor 27) connected to the power lines are used to maintain the operation of the logic circuit 31, when the electric power supply from the battery 3 is stopped.

It should be also noted that, although embodiments of the mobile terminal 1 which include a display device incorporating the liquid crystal display panel 7 are presented in the above, a person skilled in the art would appreciate that the present invention may be applied to mobile terminals which include a display device incorporating a different display panel (for example, an OLED (organic light emitting diode display panel).

Furthermore, although embodiments in which the battery 3 is used as an electric power storage device are presented in the above, a different electric power storage device, for example, an electric double layer capacitor may be used instead.

What is claimed is:
1. A mobile terminal, comprising:
a display panel which includes source lines and gate lines;
an electric power storage device;
a power supply circuitry which generates an analog power supply voltage and a first logic power supply voltage from electric power received from said electric power storage device and supplies said analog power supply voltage to a first power line and said first logic power supply voltage to a second power line;
a boosting power supply circuit configured to receive said analog power supply voltage from said first power line, to generate a boosted power supply voltage by boosting said received analog power supply voltage and to supply said boosted power supply voltage to a third power line;

a gate line drive circuitry which receives said boosted power supply voltage from said third power line to drive said gate lines;

a source line drive circuitry which drives said source lines;

a first regulator configured to generate a second logic power supply voltage by stepping down said first logic power supply voltage and to supply said second logic power supply voltage to a fourth power line;

a logic circuit configured to receive said second logic power supply voltage from said fourth power line and to control said gate line drive circuitry and said source line drive circuitry; and a charge transport path, wherein said logic circuit is responsive to a decrease in a voltage level on at least one of said first and second power lines for controlling said source line drive circuitry and said gate line drive circuitry to discharge charges accumulated in said display panel, and wherein said charge transport path is configured to transport charges from said third power line to said fourth power line in response to the decrease in the voltage level on the at least one of said first and second power lines.

2. The mobile terminal according to claim 1, wherein said charge transport path includes:

a second regulator which steps down said boosted power supply voltage received from said third power line; and a first switch connected between an output of said second regulator and said second power line or between the output of said second regulator and said fourth power line, and wherein said first switch is configured to be turned on in response to the decrease in the voltage level on the at least one of said first and second power lines.

3. The mobile terminal according to claim 1, further comprising:

a second switch inserted in said second power line, wherein said second switch is configured to be turned off in response to the decrease in the voltage level on the at least one of said first and second power lines.

4. The mobile terminal according to claim 1, further comprising:

a first bypass capacitor connected between said first power line and a circuit ground;

a second bypass capacitor connected between said second power line and the circuit ground; and a third bypass capacitor connected between said third power line and the circuit ground.

5. A display panel driver for driving a display panel including source lines and gate lines, said driver comprising:

a first power line receiving an analog power supply voltage;

a second power line receiving a first logic power supply voltage;

a boosting power supply circuit configured to receive said analog power supply voltage from said first power line, to generate a boosted power supply voltage by boosting said received analog power supply voltage and to supply said boosted power supply voltage to a third power line;

a gate control and drive circuit which receives said boosted power supply voltage from said third power line and generates a gate control signal which controls a gate driver or gate drive signals which drive said gate lines;

a source drive circuit which drives said source lines;

a first regulator configured to generate a second logic power supply voltage by stepping down said first logic power supply voltage and to supply said second logic power supply voltage to a fourth power line;

a logic circuit configured to receive said second logic power supply voltage from said fourth power supply line and to control said source drive circuit and said gate control and drive circuit; and a charge transport path, wherein said logic circuit is responsive to a decrease in a voltage level on at least one of said first and second power lines for controlling said source drive circuit and said gate control and drive circuit to discharge charges accumulated in said display panel, and wherein said charge transport path is configured to transport charges from said third power line to said fourth power line in response to the decrease in the voltage level on the at least one of said first and second power lines.

6. The display panel driver according to claim 5, wherein said charge transport path includes:

a second regulator which steps down said boosted power supply voltage received from said third power line; and a first switch connected between an output of said second regulator and said second power line or between the output of said second regulator and said fourth power line, wherein said first switch is configured to be turned on in response to the decrease in the voltage level on the at least one of said first and second power lines.

7. The display panel driver according to claim 5, further comprising:

a second switch inserted in said second power line, wherein said second switch is configured to be turned off in response to the decrease in the voltage level on the at least one of said first and second power lines.

* * * * *